May 22, 1923.

W. R. TANDY 1,456,156

ATTACHMENT FOR COMBINED HARVESTERS AND THRASHERS

Filed Nov. 7, 1921

W. R. Tandy, Inventor,

By Attorneys

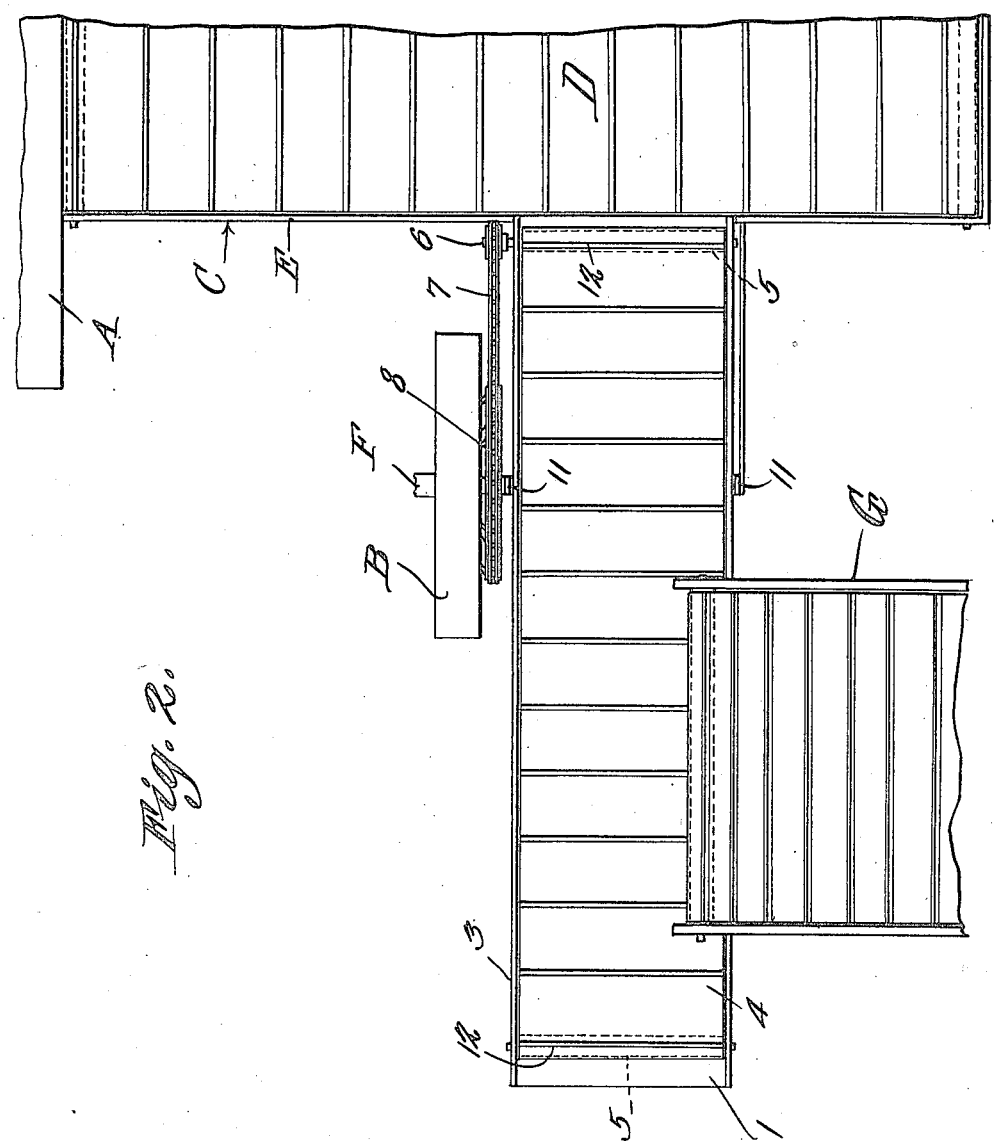

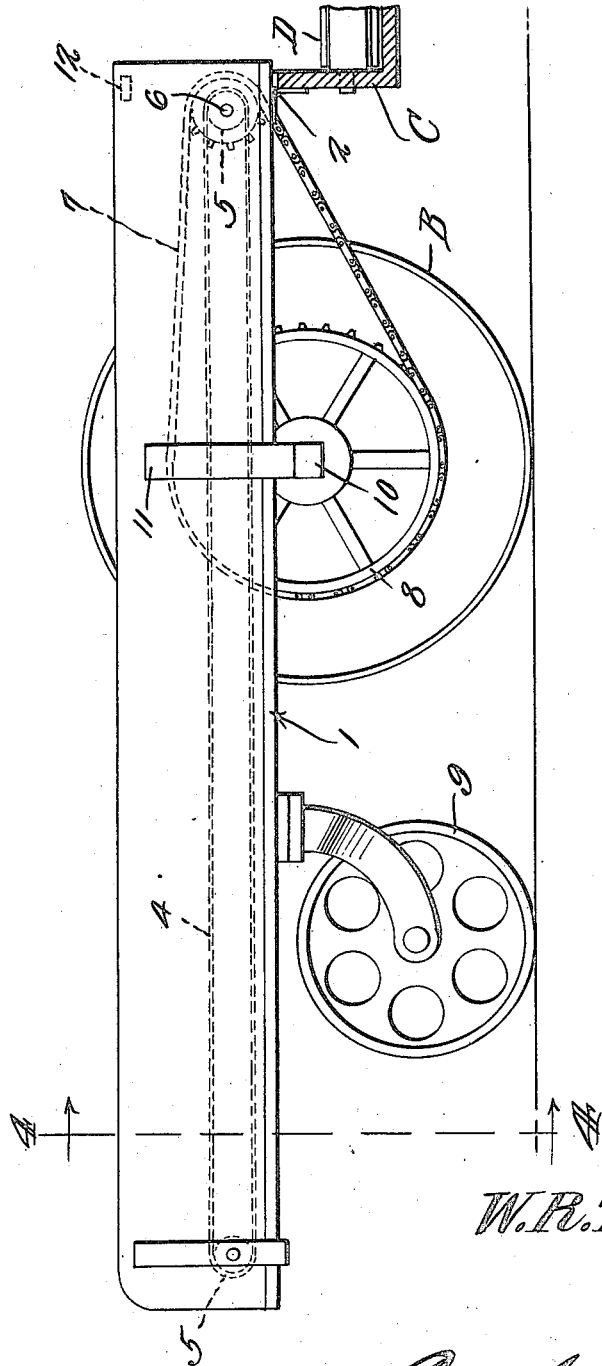

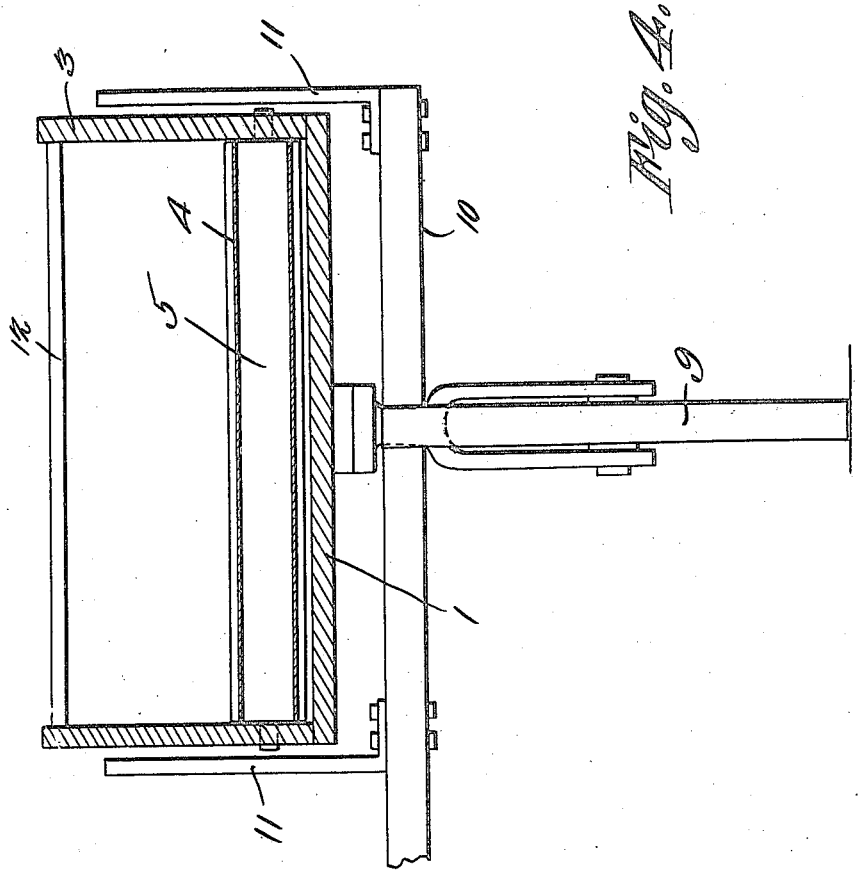

Patented May 22, 1923.

1,456,156

UNITED STATES PATENT OFFICE.

WALTER ROGER TANDY, OF ABILENE, TEXAS.

ATTACHMENT FOR COMBINED HARVESTERS AND THRASHERS.

Application filed November 7, 1921. Serial No. 513,504.

*To all whom it may concern:*

Be it known that I, WALTER R. TANDY, a citizen of the United States, residing at Abilene, in the county of Taylor and State of Texas, have invented a new and useful Attachment for Combined Harvesters and Thrashers, of which the following is a specification.

This invention relates to an attachment to be applied to a combined harvester and thrasher whereby during the operation of the machine an ordinary small sized grain header can be operated as a supplemental harvester and the material cut thereby can be directed onto the conveyor of the combined harvester and thrasher so that the amount of wheat or other grain cut and threshed can be practically doubled.

A further object is to provide an attachment of this character which can be easily connected to a combined harvester and thrasher, which can be manufactured at low cost, and which will not readily get out of order.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Figure 2 is a plan view of the structure shown in Figure 1.

Figure 3 is a side elevation of the attachment.

Figure 4 is an enlarged section on line 4—4, Figure 3.

Figure 1:
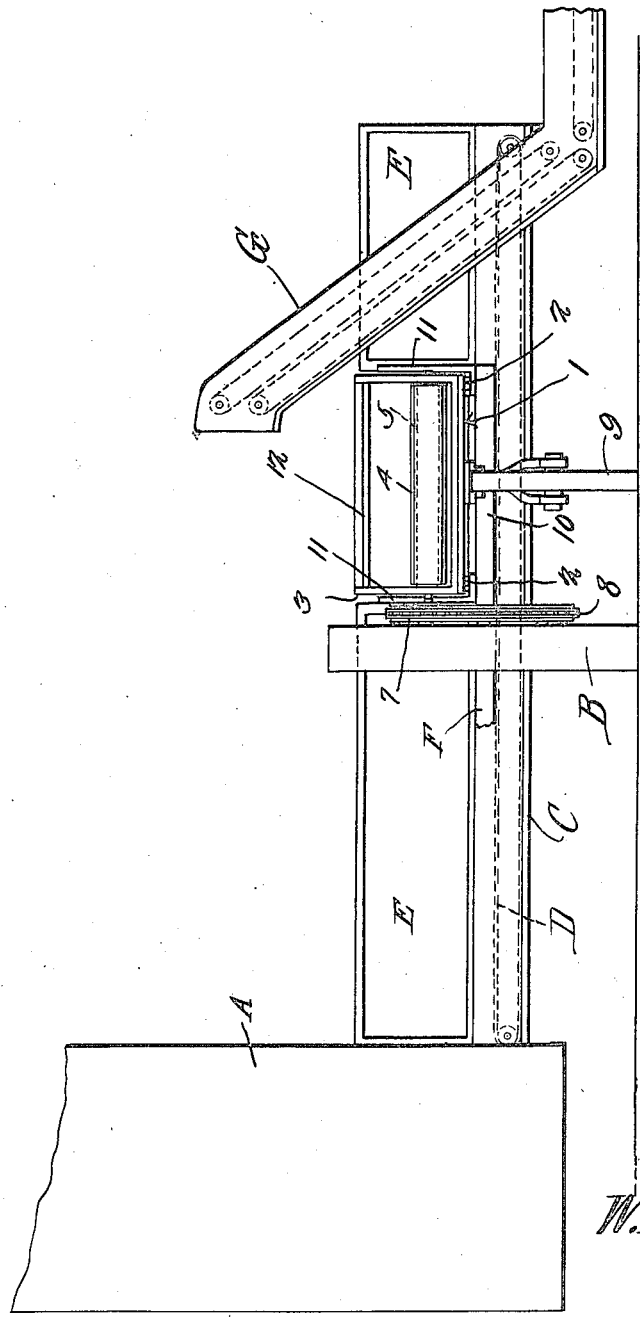
Figure 1 is a rear elevation of a portion of a combined harvester and thrasher and showing the attachment combined therewith, a part of the supplemental header being shown in position to deliver cut grain to the attachment.

Referring to the figures by characters of reference A designates a portion of a combined harvester and thrasher, the same being provided with a grain wheel B and with a platform C on which is mounted an endless conveyor D designed to carry the cut material to the threshing mechanism. The platform is provided with the usual boards E of canvas or the like.

A machine of the type mentioned operates both to cut the grain and to thresh it but its capacity is limited to the width of the path operated on by the harvesting mechanism. It is the design in the present instance to provide the machine with an attachment whereby a supplemental small sized header can be driven close to and directly back of the harvesting portion of the large machine, the grain cut by the supplemental header being directed onto the attachment and thence to the conveyor D and to the threshing mechanism.

The attachment constituting the present invention includes an elongated platform 1 hingedly connected at its front end to the back edge of the platform C, as shown at 2, this platform 1 being located inwardly from the outer end of the platform C and being adapted to deliver between the two upstanding boards E. The platform 1 is provided with the usual side boards 3 and mounted on this platform is an endless conveyor belt 4 supported on rollers 5 or the like one of which has a sprocket 6 adapted to rotate therewith. This sprocket is designed to receive motion through a chain 7 from a sprocket 8 which is attached to one side of the grain wheel B. The rear portion of the platform 1 is supported by a trailing castor 9 so that when the combined thrasher and harvester is moved forwardly the grain wheel B will be caused to rotate and motion will be transmitted therefrom through the chain 7 to the endless conveyor 4 on the supplemental platform 1.

Attached to the end of the axle F on which the grain wheel B is mounted, is a beam 10 which extends under the platform 1 and has guide standards 11 mounted thereon and between which the platform 1 is adapted to work.

It is to be understood that braces may be located wherever desired for the purpose of reenforcing the attachment, certain of these braces being indicated at 12.

After the device herein described has been attached to a combined harvester and thrasher an ordinary small sized header can be driven back of the outer end portion of the platform C. In the drawings the delivering elevator of this supplemental header has been indicated at G. This supplemental header will cut a path extending beyond the outer end or side of the platform C and the grain thus cut will be delivered by the elevator G onto the endless conveyor apron 4. This apron, in turn, will carry the grain forwardly and deliver it onto the conveyor D where it will mix with the grain cut by the harvester of the combined machine and will be carried to the threshing mechanism.

By having the supplemental platform 1 hingedly connected to the platform C, said platform will be free to move upwardly and downwardly during the travel of the castor 9 over an uneven surface.

What is claimed is:—

1. The combination with the laterally extending platform and conveyor of a combined harvester and thrasher, of a rearwardly extending platform hingedly connected at its front end to the back portion of the laterally extending platform, a wheel supporting the rear portion of the hinged platform, an endless conveyor carried by the hinged platform, a ground engaging wheel, a structure carried thereby and mounted for up and down movement independent of the hinged platform and means for transmitting motion from said last named wheel to the conveyor on the hinged platform.

2. The combination with the laterally extending conveyor platform of a combined harvester and thrasher, of a rearwardly extending platform hingedly connected at the front end to the back portion of the first named platform, a caster supporting the rear portion of the hinged platform, a drive wheel for engagement with the ground and having a floating connection with the hinged platform, said drive wheel being interposed between the caster and the hinged end of its platform, an endless conveyor on the hinged platform, and an operating connection between the drive wheel and said conveyor.

In testimony that I claim the foregoing as my own, I have hereto affixed my signature in the presence of two witnesses.

WALTER ROGER TANDY.

Witnesses:
J. E. WILLS,
T. A. BLEDSOE.